Nov. 23, 1954  P. C. GOLDMARK  2,695,360
SEARCH RECEIVING AND RECORDING APPARATUS
Filed Aug. 8, 1945  4 Sheets-Sheet 1

INVENTOR
PETER C. GOLDMARK
BY
William D. Hall.
ATTORNEY

Nov. 23, 1954  P. C. GOLDMARK  2,695,360
SEARCH RECEIVING AND RECORDING APPARATUS
Filed Aug. 8, 1945  4 Sheets-Sheet 2
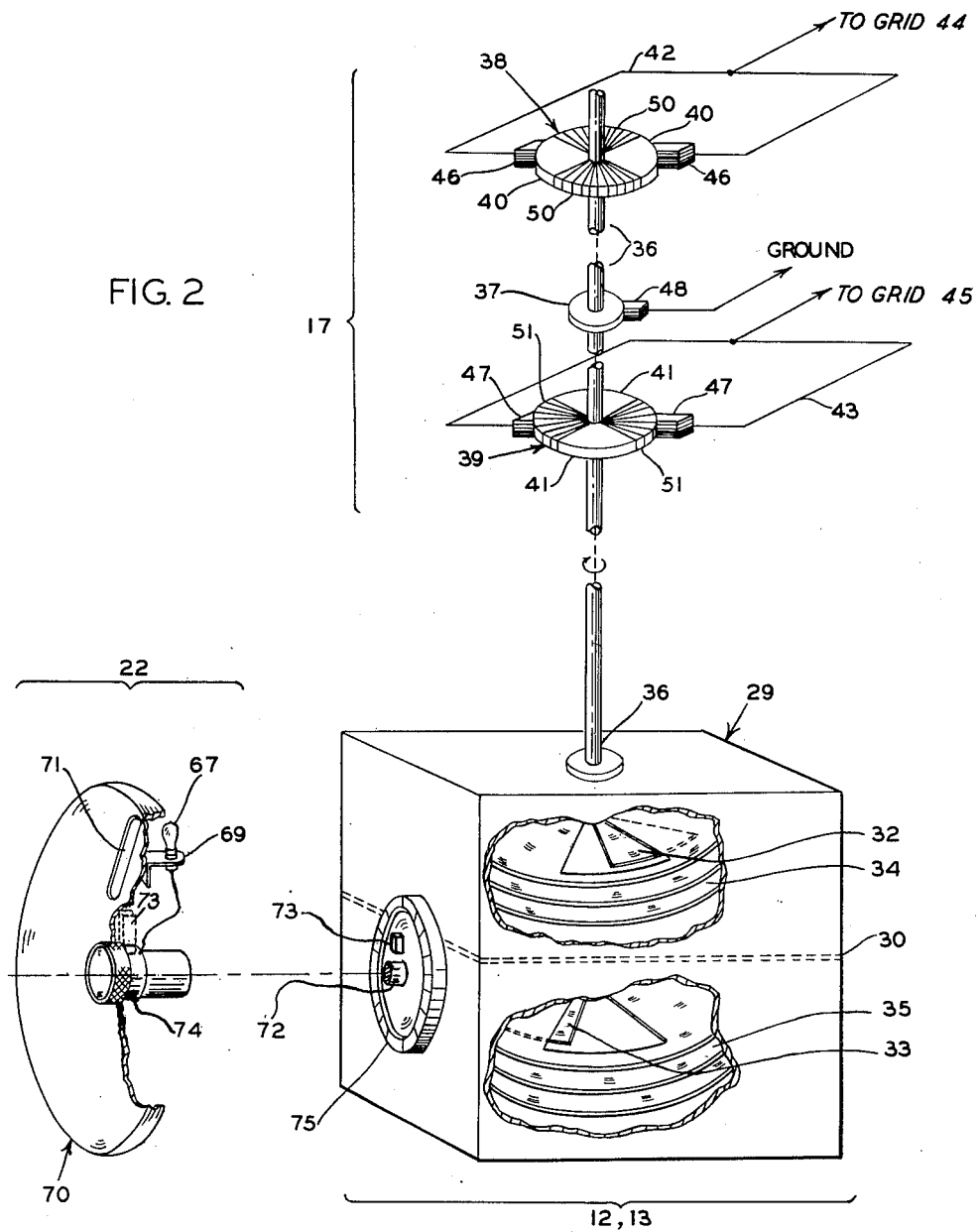
INVENTOR
PETER C. GOLDMARK
BY
William D. Hall
ATTORNEY

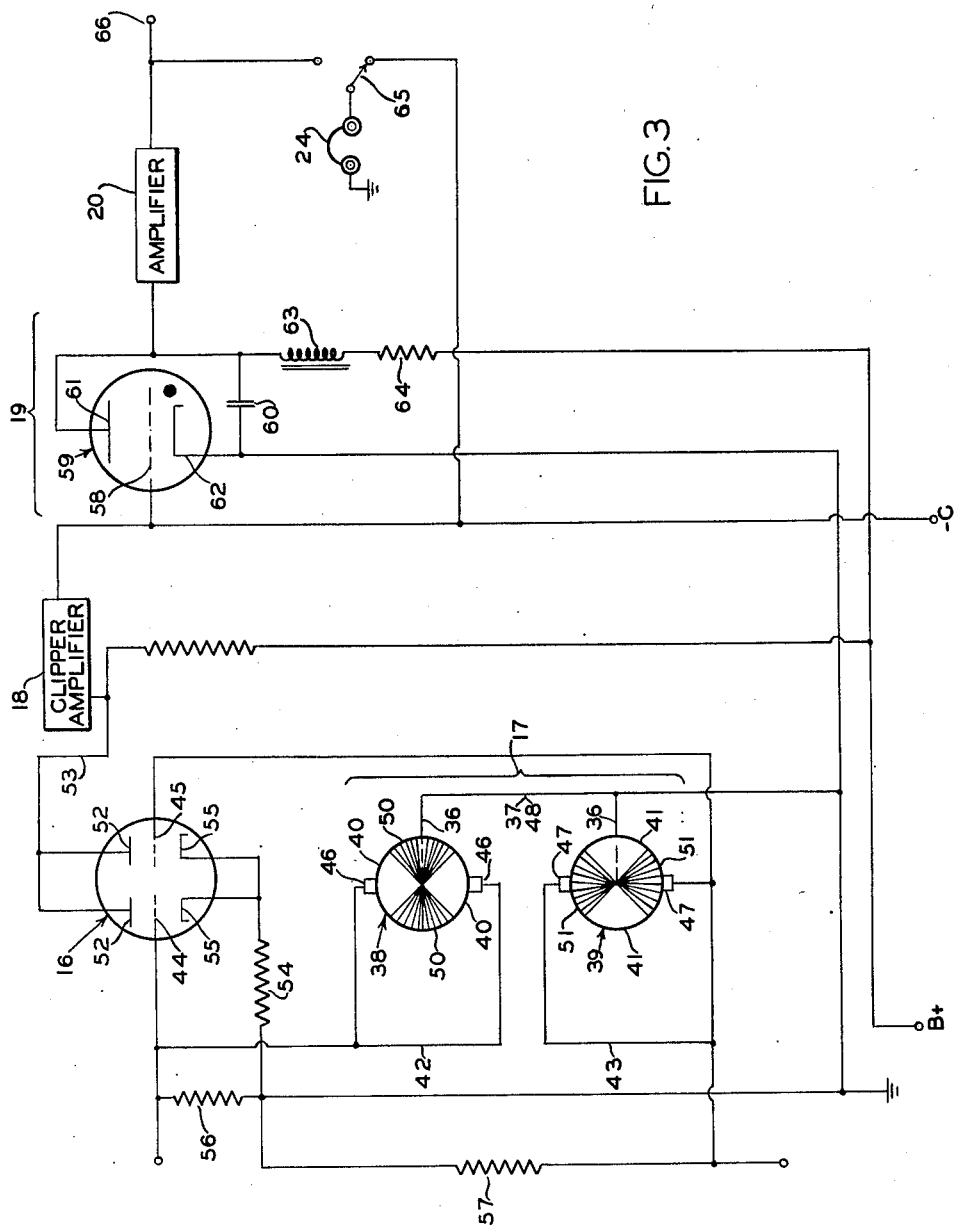

Nov. 23, 1954     P. C. GOLDMARK     2,695,360
SEARCH RECEIVING AND RECORDING APPARATUS
Filed Aug. 8, 1945     4 Sheets-Sheet 4
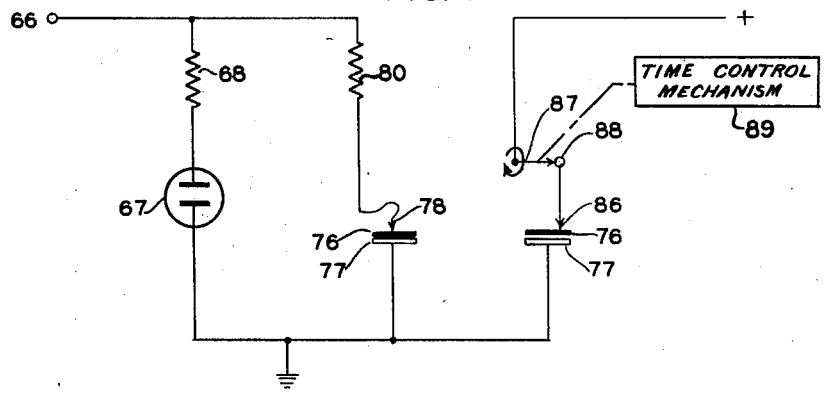
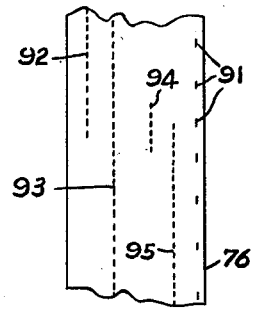
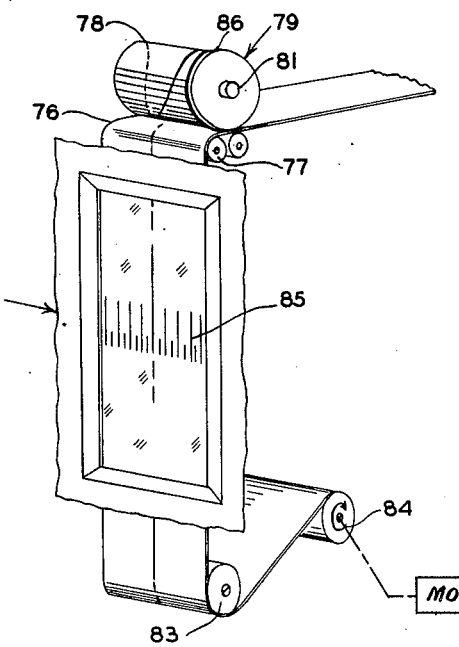
INVENTOR
PETER C. GOLDMARK
BY
*William D. Hall.*
ATTORNEY

United States Patent Office

2,695,360
Patented Nov. 23, 1954

2,695,360

SEARCH RECEIVING AND RECORDING APPARATUS

Peter C. Goldmark, New York, N. Y., assignor to the United States of America as represented by the Secretary of War Application August 8, 1945, Serial No. 609,645

5 Claims. (Cl. 250—20)

This invention relates to automatic search apparatus for intercepting, receiving, indicating, and recording signal pulses over a wide range of carrier frequencies and pulse repetition frequencies.

More specifically it relates to receiving apparatus which automatically searches or scans the ether to detect the presence of any signals over a range of carrier frequencies greater than that possible to be covered by existing types of apparatus which employ but one tuning element and which records not only the presence of such detected signals but also their frequency and the time of their reception.

The use of a search apparatus in the past has been limited because of the several problems that have been inherent in the design and operation of the apparatus so employed. Among these are the limited width of frequency ranges that it has been possible to cover by single apparatus due to the difficulty in designing practical tuning circuits to cover wide ranges. Such apparatus as has been in use in the past has been bulky and complicated in design and operation thus requiring a large space and the continual attention of one or more operators.

It is an advantage of apparatus employing the present invention that once the apparatus is set into operation a permanent record of intercepted signals, their frequency, and the time of their reception is obtained without any further attention by operators. The value of such apparatus on aircraft is apparent particularly when considered in connection with the lightness and compactness of the complete apparatus employing the principles of the present invention as compared with apparatus heretofore used in an attempt to accomplish similar results.

A further advantage of apparatus employing the present invention is that the record obtained on the recording device is uniform for any intercepted signal regardless of the intensity, pulse duration, or pulse repetition frequency of the intercepted signal.

Other objects, features, and advantages will be apparent to those skilled in the art from the following description of the invention taken in connection with the accompanying drawings in which:

Fig. 2 is a diagrammatic isometric exploded view of a preferred embodiment of the tuning elements and the apparatus mechanically and electrically associated with them;

Fig. 3 is a circuit diagram showing the circuit details of certain of the circuits employed in the receiver;

Fig. 4 is a circuit diagram of the circuits for operating the indicating and recording means;

Fig. 5 is a partial isometric view of the recording device; and

Figure 6 is a separate showing of a sample recording taken by the device in Figure 5.

Figure 1:
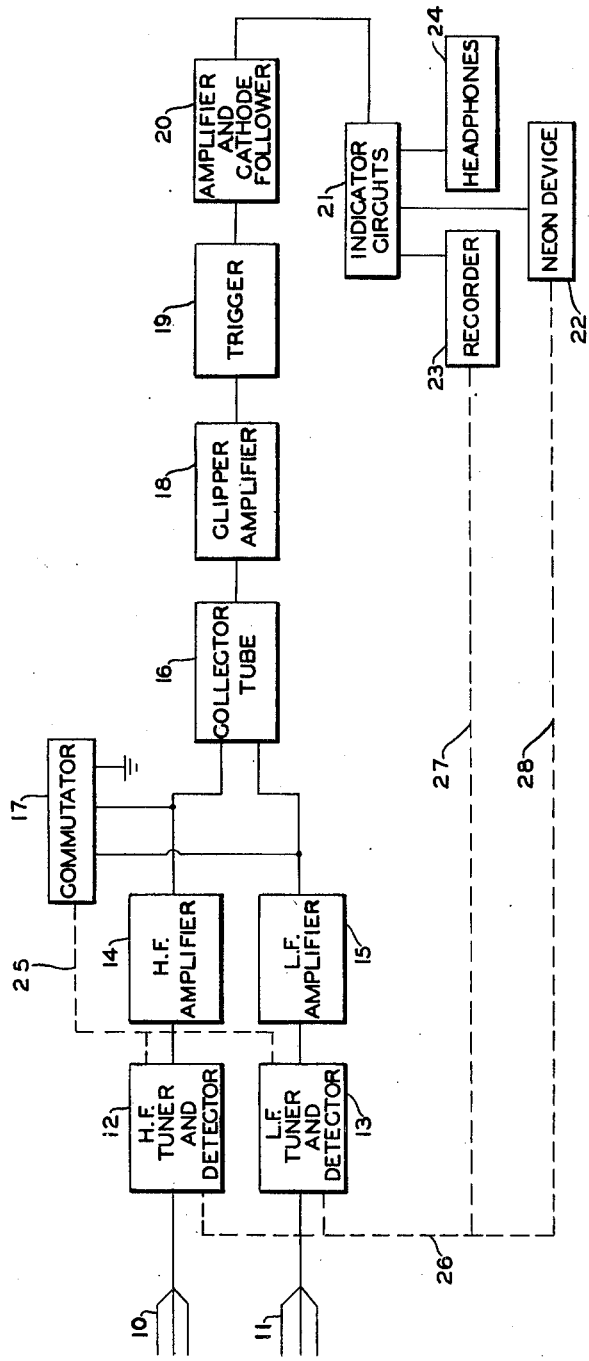
Fig. 1 is a block diagram showing the component parts of a receiver embodying the present invention.

The apparatus as shown in the drawings and as described in this specification has only two tuning channels provided with automatic tuning elements. However, it will be clear to those skilled in the art that the number of channels may readily be increased when it is desired to cover an extremely wide range of carrier frequencies or to provide a particular range into narrow channels.

The general arrangement of the component parts of apparatus embodying the principles of this invention is shown in Fig. 1. There are two antennas, high frequency antenna 10 and low frequency antenna 11. Signals received upon high frequency antenna 10 are passed to high frequency tuner and detector 12, then to high frequency amplifier 14 and from that amplifier to collector tube 16. Signals received on low frequency antenna 11 are passed to low frequency tuner and detector 13, then to low frequency amplifier 15, and then to collector tube 16. As hereinbelow described, commutator 17 functions to by-pass successively signals of all but one channel to ground. Signals received in the channel which at a given time are not by-passed are further amplified in clipper amplifier 18, pass through trigger circuit 19 which increases their average voltage, and are further amplified in amplifier 20 the last stage of which is preferably a cathode follower.

The resulting signal impulses are utilized in several indicating circuits diagrammatically represented at 21 for operating neon lamp device 22, recorder 23, and headphones 24 by which aural indication of received signals may be heard by an operator. Mechanical linkage 25 is provided between tuners and detectors 12 and 13 and commutator 17. Also mechanical linkage 26, 27 is provided between tuners and detectors 12 and 13 and the recording device 23 and mechanical linkage 26, 28 between the tuners and detectors 12 and 13 and neon lamp device 22. These mechanical linkages are described in full detail later herein.

The arrangement of the butterfly circuits and crystals in tuners and detectors 12 and 13, the operation of the commutator 17, and its functioning with relation to collector tube 16 is described and claimed in the application of Paul H. Reedy, Serial No. 609,646, filed concurrently herewith on the 8th day of August 1945, now Patent No. 2,548,819 dated April 10, 1951. The description of these circuits and apparatus given herein will be only that necessary for an understanding of their operation in apparatus embodying the present invention.

The complete butterfly circuits of tuners 12 and 13 and their associated detectors as shown in Fig. 2 are assembled in a shielding container 29 and are shielded from each other by a partition 30. The crystals rectify incoming signals in their respective channels, all carrier and other radio frequency components are filtered out by circuits conventionally designed for that purpose, and amplifiers 14 and 15 (Fig. 1) amplify only the rectified signals received in their respective channels.

Each condenser of the butterfly circuits in tuners 12 and 13 consist of a set of rotor plates 32 and 33 and stator plates 34 and 35. These are mounted on a shaft 36 on which is also mounted a slip ring 37 and discs 38 and 39 of commutator 17. This comprises the mechanical linkage shown diagrammatically in Fig. 1 as 25. Shaft 36 is driven continuously in a single direction of rotation by a motor, not shown. It may also be arranged to be turned manually. The respective angular position of rotor plates 32 and 33 about shaft 36 and their relation to their respective stator plates 34 and 35 is such that when the rotor plates of the low frequency tuner 13 interleave the stator plates of that tuner, the rotor plates of the high frequency tuner 12 are not interleaved with the stator plates of that tuner.

Each commutator disc 38 and 39 consists of two conducting segments and two insulated segments. The conducting segments 40, 40 of disc 38 are connected by conductor 42 in the circuit of high frequency grid 44 of collector tube 16 when in contact with its set of brushes 46, 46. Segments 40, 40 are in electrical contact with shaft 36 which is grounded through slip ring 37 and brush 48. Brushes 46, 46 are arranged to contact commutator discs 38 and when conducting segments 40, 40 of that disc are in contact with brushes 46, 46 the circuit of grid 44 is connected to ground. Similarly at another position of rotation of shaft 36 conducting segments 41, 41 of disc 39 connect the circuit of low frequency grid 45 of collector tube 16 to ground through the segments 41, 41, brushes 47, 47, conductor 43, shaft 36, slip ring 37, and slip ring brush 48.

When insulated segments 50, 50 of disc 38 are in contact with brushes 46, 46, high frequency grid 44 of collector tube 16 is insulated from ground and any signals present thereon will not be by-passed to ground but will pass on through the succeeding circuits of the receiver. Likewise, when insulated segments 51, 51 of disc 39 are in contact with brushes 47, 47 signals on low frequency grid 45 of collector tube 16 will not be by-passed but will be subsequently amplified and used as desired.

The angular positions of discs 38 and 39 are such that conducting segments 40, 40 of disc 38 are in contact with brushes 46, 46 when rotor plates 33 of the low frequency tuner 13 are interleaved with their respective stator plates 35, and conducting segments 41, 41 of disc 39 are in contact with brushes 47, 47 when rotor plates 32 of the high frequency tuner 12 are interleaved with their respective stator plates 34.

Both the rotor plates 32 and 33 and stator plates 34 and 35 of tuners 12 and 13 are less than a full quadrant, or 90°, and both the conducting segments 40, 40 and 41, 41 of commutator discs 38 and 39 are more than a full quadrant or 90°. The reduction in the angular dimension of the plates is necessary to provide periods during each rotation of shaft 36 for the withdrawal of one set of rotor plates from their interleaved position before the other set starts to interleave its stator plates. The overlap in the conducting commutator segments is provided so that no signals pass to the succeeding circuits of the receiver during these periods.

Brushes 46, 46 and 47, 47 and commutator discs 38 and 39 are made independently adjustable around shaft 36 to ensure that contacts between the commutator segments and the brushes occur at the right time and continue for the proper duration during the periods of rotation of shaft 36. Once these adjustments are made for a given piece of apparatus it is generally unnecessary to make further adjustments.

Collector tube 16 as shown in Fig. 3 is a dual triode with its plates 52, 52 connected together to form a common plate circuit 53. Any arrangement of amplifying tubes may be used such as individual tubes with their plate circuits connected to form a common circuit. The essential features are an independent grid for each frequency channel and all plate circuits collected into a common circuit. Tube 16 operates as a conventional amplifier but due to the action of commutator 17 amplifies signals in but one channel at a time.

Resistor 54 connected between cathodes 55, 55 of collector 16 and ground, resistor 56 connected between grid 44 and ground, and resistor 57 connected between grid 45 and ground produce the desired grid biases for proper operation of the collector tube 16.

From the collector tube 16 signals pass into clipper and amplifier circuits 18 of conventional design. The clipper circuit is designed to clip both the top of the received signals and all of that portion below the noise level. Thus, the output of the clipper amplifier 18 is an amplified pulse which is introduced upon the grid 58 of the trigger tube 59 which is a gas filled triode.

A detailed description of the elements and mode of operation of trigger circuit 19 is not necessary to an understanding of the present invention other than to state that the output of that circuit, which is fed to amplifier 20, is characterized by having a high duty cycle, a high and approximately constant average voltage which is independent of the amplitude of the incoming signal pulses, the duration of each individual incoming signal pulse, or the repetition rate of the incoming signal pulses. The elements of the trigger circuit 19 comprise gas filled triode 59, capacitor 60, connected across its plate 61 and cathode 62, and a series combination of inductor 63, having a very high value of inductance, and resistor 64 between plate 61 and the supply voltage B+. A full description of this circuit, its operation and results obtained by it are disclosed and claimed in the application of Paul H. Reedy, Serial No. 609,647, filed concurrently herewith on the 8th day of August 1945, now abandoned.

It has been found in order to obtain improved operation over a wide range of pulse repetition frequencies that amplifier 20 may be designed to have such a bias that the peaks of the impulses presented to it are above saturation or below cut-off. Amplifiers so designed will improve operation at very high pulse repetition frequencies. It has also been found advantageous to design the last stage of amplifier 20 to operate as a cathode follower to accomplish proper impedance matching.

As shown in Fig. 3, headphones 24 are provided for use when it is desired to listen to intercepted signals instead of, or in addition to, obtaining the visual indication provided for by other indicating and recording devices later described. Switch 65 permits connection of headphones 24 either between grid 58 of the trigger tube 59 and ground so that signals may be observed before triggering or between the output of the amplifier 20 and ground so that the pulses presented to the indicating circuits may be heard. When the headphone switch 65 is in position as shown in Fig. 3, to hear the signal before triggering action, the pulse repetition frequency thereof may be roughly determined by comparing tones of received signals when scanning is stopped at the point of maximum signal intensity.

The indicating circuits and their associated apparatus are shown diagrammatically in Fig. 4. The output of amplifier 20 (Fig. 3) is fed to the input terminal 66 of this section of the apparatus.

One of the indicating devices 22 comprises a gas filled light bulb 67, which, when energized, produces a light. The circuits are arranged so that bulb 67 is illuminated only when an impulse exists at terminal 66. The bulb 67 is connected between the output of amplifier 20 and ground through resistor 68 of proper value to limit the current through bulb 67 to a maximum safe value.

Referring now to Fig. 2, bulb 67 is mounted by bracket 69 on disc 70 in a position directly opposite radial slit 71 in disc 70. Disc 70 (shown on an enlarged scale in order to show its detail) is mounted on shaft 72 which is geared to shaft 36 by any suitable and well known means so that shaft 72 rotates at twice the speed of shaft 36. This is the mechanical linkage shown diagrammatically in Fig. 1 as 26, 28. The electrical connection from the output of amplifier 20 through resistor 68 (Fig. 4) is physically made through brush 73 mounted on container 29 of the tuner elements 12 and 13 and slip ring 74 mounted on shaft 72 and insulated therefrom as shown in Fig. 2. The portion of brush 73 with respect to slip ring 74 is shown by a broken outline on the back of disc 70 as well as in its actual position on container 29. The physical connection to ground is made through shaft 72 to grounded shaft 36. Mounted on container 29 is a circular scale 75 calibrated in frequencies.

Whenever a signal is received the bulb 67 emits a flash of light which illuminates slit 71. If disc 70 is arranged to rotate at twice the speed of shaft 36, since for each rotation of shaft 36 the entire frequency range is scanned twice, it may be seen that disc 70 would rotate once for each complete scanning. When bulb 67 is energized slit 71 appears both stationary and illuminated at the angular position corresponding to the frequency of the signal received which may be read off scale 75. Thus, a presentation of all received signals in the entire frequency range scanned is afforded, each signal exhibiting itself as a stationary radial slit of light on the disc 70 in proper relation to scale 75.

The recording device 23 of Fig. 1, the electrical circuits of which are shown diagrammatically in Fig. 4, and the mechanical details of which are shown in Fig. 5, consists of a movable sheet of electro-sensitive material 76 such as carbon coated paper which is at all times in contact with two electric contactors. One of these is a roller 77 over which the paper passes. This roller 77 is grounded. The other contactor is a raised portion 78 on a roller 79 and is connected to the output 66 of amplifier 20 through limiting resistor 80. When an impulse of sufficient value to break down the resistance of the electro-sensitive paper 76 is present at terminal 66, it is impressed across the contactors 77 and 78. The breaking down of paper 76 permits current to flow from contactor 78 through the paper to contactor 77 and causes a mark to be impressed on paper 76. Conduction through the paper 76 will continue as long as the impulse is of sufficient value and a smooth line of constant width will be marked on the paper since the current after breakdown remains substantially constant by operation of trigger circuit 19.

Referring now more particularly to Fig. 5, cylinder 79, on which is raised portion 78, is mounted on shaft 81 which is driven by the same driving means that drives shaft 36 (Fig. 2) and its rotation is synchronized with the rotation of that shaft. This is the mechanical linkage shown in Fig. 1 diagrammatically as 26, 27. The raised portion 78 extends the length of cylinder 79 and one end of it is displaced from the other by 360° so that for one rotation of cylinder 79 the point of contact of contactor 78 with the sensitized paper 76 travels the width of paper 76.

Sensitized paper 76 is drawn over roller 77 by any suitable means which does not need to be synchronized with the rotation of tuner shaft 36 or of shaft 81. After passing over the roller 77 the paper is exhibited in a frame 82 and is rolled on a spool 84 which may later be removed from the apparatus for inspection. Spool 84 may be separately driven by constant speed motor 90 or it may be coupled for rotation by suitable means, such as a continuous belt, to shaft 81, in which case it will be synchronized with cylinder 79.

Since the point of contact of contactor 78 on the paper 76 is dependent upon the frequency at which a signal is received, the paper or a transparent scale in front of it may be calibrated as at 85 so that the frequency of received signals may be read directly.

In order to register the time of reception of signals on paper 76 a collar 86 is mounted on shaft 81 but insulated therefrom. Collar 86 is always in contact with paper 76 preferably at a point near the edge of the paper and is connected to a source of voltage through a rotating switch 87 driven by clock work or other time controlled mechanism, indicated by block 89, so that switch contact 88 is made once for every given predetermined time interval. Collar 86 thus causes marks to be made on the edge of paper 76 which represent the predetermined time interval.

Contactor 78 and collar 86 are connected to resistor 80 and contact 88, respectively, by conventional means such as slip rings mounted on shaft 81 in engagement with suitable brushes. Synchronism need not exist between the time controlled mechanism 89 for operating switch 87 and cylinder 79 or spool 84. Regardless of the particular rate of revolution of shaft 81 or motor 90, the time marks impressed upon record paper 76 will indicate the reception time of the signal marks appearing on the paper which correspond in position with the time marks thereon, and, by interpolation, the reception time of the signal marks intermediate successive time marks. In actual operation, it has been the practice to notate the first time mark impressed on paper 76 with a numeral giving the exact starting time of the device. The reading of successive time marks is then determined relative to this reference numeral.

Referring now to Figure 6, a portion of a typical sample recording is illustrated. The widely spaced marks 91 appearing adjacent the edge of paper 76 represent time intervals, while the closely spaced series of marks 92, 93, 94, and 95, each represent distinct received signals. Since the received signals may continue uninterruptedly for extended periods, as the receiver repeatedly scans and the record paper is moved a series of signal marks are impressed in a longitudinal path along paper 76. While a calibrated transparent scale 85 has been provided in Figure 5 to enable readings of the received signal frequencies, it will be obvious that frequency readings may also be facilitated by printing horizontal and vertical indicia on paper 76, the horizontal being calibrated for time and the vertical for frequency.

While there has been here described what is at present considered to be the preferred embodiment of the invention, it will be obvious to those skilled in the art that various changes and modifications may be made therein without departing from the scope of the invention.

What is claimed is:

1. A visual recording device for recording the presence and transmitted frequency of signals in a given frequency channel received by automatic search receiving apparatus having variable tuning means associated with said recorder comprising a first roller for engaging electro-sensitive material, said first roller acting as a first electric contact, a second roller having a raised portion extending from one edge of said roller to the other edge and radially disposed around one complete circumference of said roller, said raised portion acting as a second electric contact, said material being interposed between said first and second electric contacts, said second roller being driven in synchronism with the tuning means of said automatic search receiver so that said second roller makes one complete revolution for each search period of said receiver over said frequency channel, means responsive to the reception of a signal by said receiver for impressing a voltage between said first contact and said second contact sufficient in magnitude to break down said electro-sensitive material and make a mark thereon whereby the frequency of said signal may be determined by the position of said marks on said electro-sensitive material, and means for moving said electro-sensitive material between said rollers.

2. In automatic search receiving apparatus having variable tuning means a device for recording received signals in a given frequency channel in which the transmitted frequency of said signals is recorded, said device consisting of a pair of electric contacts between which is interposed an electro-sensitive material, means for impressing a voltage across said pair of contacts when a signal is received of sufficient magnitude to break down said material and make a mark thereon, means for moving one of said contacts in relation to the other, said last means being synchronized with the tuning means of the receiver so that the movable contact travels the width of said electro-sensitive material once during each search period of the receiver over said frequency channel, and means for moving said electro-sensitive material in a direction at right angles to the motion of said movable contact.

3. In radio signal receiving apparatus covering a wide range of frequencies a plurality of radio frequency tuners, each of said tuners including variable tuning elements and a detector, each of said tuners covering a predetermined portion of said wide range of frequencies, the respective portions of said wide range of frequencies covered by each of said tuners being contiguous to each other, not overlapping, and completely covering the entire wide range of frequencies, common driving means for continuously varying said tuning elements, means for successively amplifying the signals received by each of said tuning elements, and visual recording means utilizing a single system of coordinates for indicating the presence of all received signals within both portions of said wide range of frequencies and for indicating the frequency and time of reception thereof.

4. In a radio signal receiving apparatus covering a wide range of frequencies, a plurality of radio frequency tuners, each of said tuners including variable tuning elements and a detector, each of said tuners covering a predetermined portion of said wide range of frequencies, the respective portions of said wide range of frequencies covered by each of said tuners being contiguous to each other, not overlapping, and completely covering the wide range of frequencies, common driving means for continuously varying said tuning elements, means for successively amplifying the detected signals from each of said tuners, means for clipping all that portion of said detected signals below the noise level and a portion of the top of said detected signals, means for producing from said clipped and detected signals impulses of constant average energy independent of the amplitude, duration and repetition rate of said detected signals, and means utilizing a single system of coordinates for recording the presence and carrier frequency of said received signals in both of said portions of the wide range apparatus.

5. A device for recording the presence, transmitted frequency and time of reception of signals received in a given frequency channel by automatic search receiving apparatus having variable tuning means associated with said recorder comprising a first roller for engaging electro-sensitive material, said first roller acting as a first electric contact, a second roller having a raised portion extending from one edge of said roller to the other edge and radially disposed around one complete circumference of said roller, said raised portion acting as a second electrical contact, an annular member coaxially aligned with said second roller and rotating therewith, said annular member acting as a third electric contact, said material being interposed between said first and said second and third electric contacts, said second roller and said annular member being driven by means synchronized with the tuning means of said automatic search receiver so that they make one complete revolution for each search period of said receiver over said frequency channel, means responsive to the reception of a signal by said receiver for impressing a voltage impulse between said first contact and said second contact sufficient in magnitude to break down said electro-sensitive material and make a signal mark thereon whereby the frequency of said signal may be determined by the relative positions of said signal marks across said electro-sensitive material, and means for impressing a voltage impulse at predetermined time intervals between said first contact and said third contact sufficient in magnitude to break down said electro-sensitive material and make a time mark thereon whereby the time of reception of said signal may be determined by the position of said time mark on said material relative to said signal mark.

References Cited in the file of this patent

UNITED STATES PATENTS

| Number | Name | Date |
|---|---|---|
| 1,917,268 | Mirick | July 11, 1933 |
| 2,025,645 | Carpenter | Dec. 24, 1935 |
| 2,091,152 | Malpica | Aug. 24, 1937 |
| 2,113,214 | Luck | Apr. 5, 1938 |
| 2,146,862 | Schumand | Feb. 14, 1939 |
| 2,213,886 | Potter | Sept. 3, 1940 |
| 2,228,883 | Morgan | Jan. 14, 1941 |
| 2,230,502 | Pearson | Feb. 4, 1941 |
| 2,249,324 | Potter | July 15, 1941 |
| 2,279,151 | Wallace | Apr. 7, 1942 |
| 2,308,198 | Muehter | Jan. 12, 1943 |
| 2,312,203 | Wallace | Feb. 23, 1943 |
| 2,323,534 | Goddard | July 6, 1943 |
| 2,323,924 | Meyer | July 13, 1943 |
| 2,344,562 | Potter | Mar. 21, 1944 |
| 2,374,653 | Colt et al. | May 1, 1945 |
| 2,381,940 | Wallace | Aug. 14, 1945 |
| 2,387,760 | Keinath | Oct. 30, 1945 |
| 2,392,546 | Peterson | Jan. 8, 1946 |
| 2,397,884 | Rhodes | Apr. 2, 1946 |
| 2,403,562 | Smith | July 9, 1946 |
| 2,412,670 | Epstein | Dec. 17, 1946 |
| 2,415,919 | Thomas | Feb. 18, 1947 |

FOREIGN PATENTS

| Number | Country | Date |
|---|---|---|
| 312,140 | Italy | Oct. 23, 1933 |
| 813,404 | France | June 1, 1937 |

OTHER REFERENCES

"Panoramic Reception and Radio Navigation," by M. Wallace, 17 pages, New York, N. Y.